United States Patent
Vangheepuram et al.

(10) Patent No.: US 10,855,515 B2
(45) Date of Patent: Dec. 1, 2020

(54) IMPLEMENTING SWITCHOVER OPERATIONS BETWEEN COMPUTING NODES

(71) Applicant: NetApp Inc., Sunnyvale, CA (US)

(72) Inventors: Sriram Gudalore Vangheepuram, Fremont, CA (US); Vijay Kumar Chakravarthy Ekkaladevi, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 360 days.

(21) Appl. No.: 14/928,137

(22) Filed: Oct. 30, 2015

(65) Prior Publication Data
US 2017/0126479 A1 May 4, 2017

(51) Int. Cl.
| | |
|---|---|
| *H04L 12/04* | (2006.01) |
| *G06F 11/07* | (2006.01) |
| *H04L 12/24* | (2006.01) |
| *G06F 11/20* | (2006.01) |

(52) U.S. Cl.
CPC ...... *H04L 41/0654* (2013.01); *G06F 11/0727* (2013.01); *G06F 11/0757* (2013.01); *G06F 11/2092* (2013.01); *G06F 2201/815* (2013.01)

(58) Field of Classification Search
CPC .................................................. H04L 41/0654
See application file for complete search history.

(56) References Cited

U.S. PATENT DOCUMENTS

| | | | | |
|---|---|---|---|---|
| 6,625,751 B1 * | 9/2003 | Starovic | ............. | G06F 11/1484 714/11 |
| 8,266,472 B2 * | 9/2012 | Bose | ................... | G06F 11/2092 714/4.11 |
| 8,413,145 B2 * | 4/2013 | Chou | .................. | G06F 11/2097 718/1 |

(Continued)

FOREIGN PATENT DOCUMENTS

| | | | | |
|---|---|---|---|---|
| EP | 0800303 A1 | 11/2014 | | |
| JP | 2016151816 A | * | 8/2016 | ............ G06F 11/203 |

OTHER PUBLICATIONS

Int. Search Report/Written Opinion cited in PCT Application No. PCT/US2016/059358 dated Feb. 2, 2017, 11 pgs.

*Primary Examiner* — Parth Patel
*Assistant Examiner* — Berhanu D Belete
(74) *Attorney, Agent, or Firm* — Cooper Legal Group, LLC

(57) ABSTRACT

One or more techniques and/or computing devices are provided for determining whether to perform a switchover operation between computing nodes. A first computing node and a second computing node, configured as disaster recovery partners, may be deployed within a computing environment. The first computing node and the second computing node may be configured to provide operational state information (e.g., normal operation, a failure, etc.) to a cloud environment node state provider and/or cloud persistent storage accessible through a cloud storage service. Accordingly, a computing node may obtain operational state infor- (Continued)

US 10,855,515 B2
Page 2 mation of a partner node from the cloud environment node state provider and/or the cloud storage service notwithstanding a loss of internode communication and/or an infrastructure failure that may otherwise appear as a failure of the partner node. In this way, the computing node may accurately determine whether the partner node has failed.

20 Claims, 13 Drawing Sheets

(56) References Cited

U.S. PATENT DOCUMENTS

| Patent / Publication No. | Date | Inventor | Classification |
|---|---|---|---|
| 8,751,863 B2* | 6/2014 | Calder | G06F 11/2094 714/6.3 |
| 8,799,422 B1* | 8/2014 | Qu | H04L 45/64 709/220 |
| 8,935,563 B1* | 1/2015 | Rajaa | G06F 11/0709 714/4.11 |
| 8,943,498 B2* | 1/2015 | Frank | G06F 9/45558 718/1 |
| 9,304,879 B2* | 4/2016 | Umbehocker | G06F 11/2092 |
| 9,417,968 B2* | 8/2016 | Dornemann | G06F 9/45558 |
| 9,575,848 B2* | 2/2017 | Goodman | G06F 11/1469 |
| 9,747,180 B1* | 8/2017 | Fair | G06F 11/201 |
| 9,800,459 B1* | 10/2017 | Fair | H04L 41/0654 |
| 9,858,154 B1* | 1/2018 | Lyadvinsky | G06F 11/1448 |
| 9,940,073 B1* | 4/2018 | Thangapalam | G06F 3/0665 |
| 10,452,303 B2* | 10/2019 | Dornemann | G06F 3/0605 |
| 2003/0233502 A1* | 12/2003 | Murotani | G06F 11/0727 710/74 |
| 2004/0250029 A1* | 12/2004 | Ji | G06F 11/2066 711/162 |
| 2004/0250030 A1* | 12/2004 | Ji | G06F 3/0613 711/162 |
| 2004/0250032 A1* | 12/2004 | Ji | G06F 11/2074 711/162 |
| 2004/0260972 A1* | 12/2004 | Ji | G06F 11/2074 714/11 |
| 2004/0260976 A1* | 12/2004 | Ji | G06F 11/2064 714/31 |
| 2005/0204183 A1 | 9/2005 | Saika | |
| 2006/0168192 A1* | 7/2006 | Sharma | H04L 69/40 709/224 |
| 2008/0162984 A1* | 7/2008 | Kalra | H04L 41/0213 714/4.11 |
| 2010/0306770 A1* | 12/2010 | Frank | G06F 9/45558 718/1 |
| 2011/0013508 A1* | 1/2011 | Tuplur | H04L 45/00 370/218 |
| 2011/0107136 A1* | 5/2011 | Jonnagadla | G06F 11/1482 714/3 |
| 2012/0173919 A1* | 7/2012 | Patel | G06F 12/0808 714/4.11 |
| 2013/0036323 A1* | 2/2013 | Goose | G06F 11/1484 714/4.11 |
| 2013/0238930 A1* | 9/2013 | Umbehocker | G06F 11/2092 714/6.32 |
| 2013/0283092 A1* | 10/2013 | Das | G06F 11/1484 714/3 |
| 2013/0297800 A1* | 11/2013 | Considine | H04L 41/12 709/226 |
| 2014/0040206 A1* | 2/2014 | Ramakrishnan | G06F 11/2097 707/640 |
| 2014/0095925 A1* | 4/2014 | Wilson | G06F 11/2028 714/4.12 |
| 2014/0258608 A1* | 9/2014 | Viswanatha | G06F 12/0873 711/113 |
| 2015/0019900 A1 | 1/2015 | Griffith et al. | |
| 2015/0127982 A1* | 5/2015 | Tung | G06F 16/27 714/19 |
| 2015/0269043 A1 | 9/2015 | Wilson et al. | |
| 2015/0278046 A1* | 10/2015 | Zellermayer | G06F 11/1438 714/4.11 |
| 2015/0304241 A1* | 10/2015 | Grabarnik | G06F 16/23 709/226 |
| 2015/0317222 A1* | 11/2015 | Mahindru | G06F 11/2028 714/4.11 |
| 2016/0034357 A1* | 2/2016 | Anglin | G06F 11/1458 714/4.11 |
| 2016/0048408 A1* | 2/2016 | Madhu | G06F 11/2056 718/1 |
| 2016/0057214 A1* | 2/2016 | Anand | G06F 9/505 709/226 |
| 2016/0085574 A1* | 3/2016 | Dornemann | G06F 11/2094 718/1 |
| 2016/0142350 A1* | 5/2016 | Mutha | H04L 51/08 709/206 |
| 2016/0142485 A1* | 5/2016 | Mitkar | H04L 67/1097 707/681 |
| 2016/0210209 A1* | 7/2016 | Verkaik | G06F 11/2033 |
| 2016/0241450 A1* | 8/2016 | Iimura | G06F 11/203 |
| 2016/0277509 A1* | 9/2016 | Qiang | H04L 67/16 |
| 2016/0292053 A1* | 10/2016 | Antony | G06F 11/2038 |
| 2016/0323147 A1* | 11/2016 | Kirsch, II | H04L 41/0886 |
| 2016/0328226 A1* | 11/2016 | Arya | G06F 8/61 |
| 2016/0328525 A1* | 11/2016 | Gross | G16H 50/20 |
| 2017/0003895 A1* | 1/2017 | Hatfield | G06F 11/2058 |
| 2017/0060975 A1* | 3/2017 | Akyureklier | G06F 11/2097 |
| 2017/0116556 A1* | 4/2017 | Brower, Jr. | G06F 16/22 |
| 2017/0118290 A1* | 4/2017 | Mitkar | H04L 67/1097 |
| 2017/0199770 A1* | 7/2017 | Peteva | G06F 9/5088 |
| 2017/0207971 A1* | 7/2017 | Kripalani | H04L 67/34 |
| 2019/0196921 A1* | 6/2019 | Verkaik | G06F 11/3006 |

\* cited by examiner

IMPLEMENTING SWITCHOVER OPERATIONS BETWEEN COMPUTING NODES

BACKGROUND

Many providers of services, such as network storage providers, may utilize a cloud computing environment (e.g., a third party cloud provider) to host computing nodes that provide such services. For example, a network storage provider may deploy a first computing node, into the cloud computing environment, for providing storage services to a finance department of a company. The storage provider may deploy a second computing node, into the cloud computing environment, for providing storage services to an engineer department of the company. The storage provider may configure the first computing node and the second computing node as disaster recovery partners, such that a surviving computing node may takeover resources of a failed computing node in order to provide clients with failover access to services previously provided by the failed computing node (e.g., upon detecting that the first computing node has failed, the second computing node may take over storage of the first computing node in order to provide failover storage services to the finance department such as access to data previously accessible through the first computing node).

The first computing node and the second computing node may establish an internode communication link, such as internet protocol (IP) communication, for sharing operational state information (e.g., a heartbeat and/or a notification that a computing node is operational, rebooting, failed, is in a kernel panic mode, etc.). Unfortunately, if communication is lost over the internode communication link, then a computing node may be unable to determine whether a partner computing node has failed or whether the internode communication link is down such as due to an IP network failure within the cloud computing environment. Thus, if the computing node incorrectly assumes that the partner computing node has failed, then the computing node may erroneously attempt to takeover for the partner computing node that is still operational. In contrast where a failure of the partner computing node is the cause of the communication loss (e.g., the failed partner computing node is unable to transmit heartbeat information due to the failure), if the computing node incorrectly assumes that the communication loss is due to the internode communication link being down, then clients may loss access to the storage service provided by the failed partner computing node because the computing node may not takeover for the failed partner computing node. Similarly, if the first computing node and the second computing node are configured to share operational state information through storage managed by respective computing nodes, then a computing node may be unable to detect whether a partner computing node has failed in the event the computing node losses access to the storage of the partner computing node, such as due to a cloud computing environment infrastructure failure.

DETAILED DESCRIPTION

Figure 1:
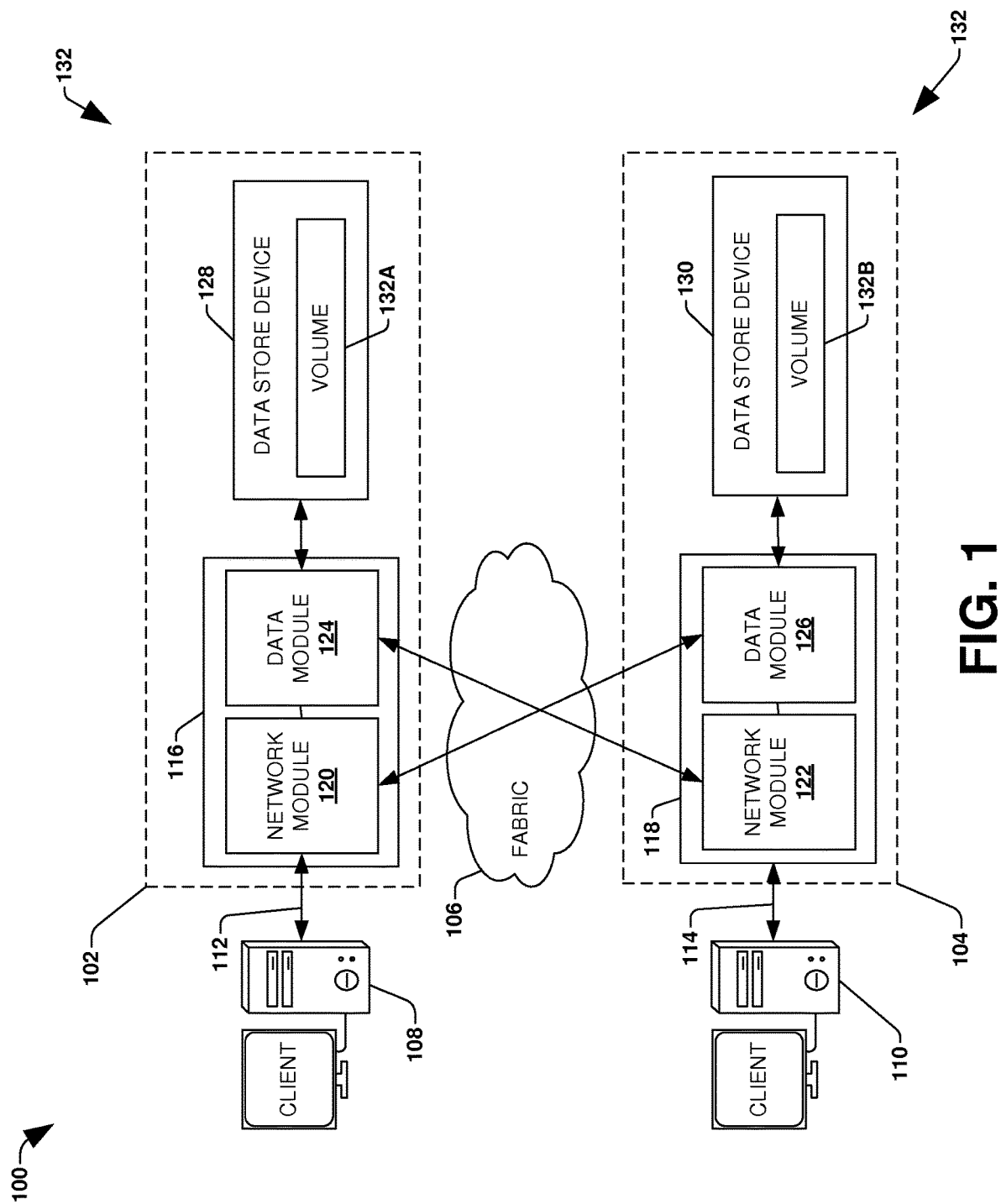
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for determining whether to perform a switchover operation between computing nodes are provided. For example, a first computing node and a second computing node may be deployed into a computing environment (e.g., a cluster network storage computing environment, a cloud computing environment hosted by a third party, or any other computing environment). The first computing node and the second computing node may share operational state information over an internode communication link (e.g., an IP network) and/or through storage managed by partner computing nodes (e.g., the first computing node may store operational health information within storage owned by the first computing node and accessible for reading by the second computing node).

If the operational state information indicates that a computing node has failed (e.g., a loss of a heartbeat), then the surviving computing node may perform a switchover operation to provide clients with failover access to resources previously accessible to the clients through the failed computing node. Because the internode communication link may go down and/or a cloud computing environment infrastructure failure may result in computing nodes being unable to access operational state information within storage owned by partner computing nodes, a computing node may erroneously perform a switchover operation for a partner computing node that has not actually failed. Accordingly, as provided herein, the first computing node and the second computing node may be configured to share operational state information through a cloud environment node state provider (e.g., the cloud environment node state provider may monitor operational states of computing nodes within the cloud computing environment) and/or cloud persistent storage that is accessible through a cloud storage service (e.g., a computing node may store operational state information through cloud persistent storage that is highly available to the partner computing node). In this way, a computing node may reliably determine whether a partner computing node has failed (e.g., a loss of a heartbeat due to a failure of the partner computing node) or not (e.g., a loss of a heartbeat due to the internode communication link being down and/or an infrastructure failure such as a cloud computing environment infrastructure failure), which may mitigate erroneous switchover.

To provide context for determining whether to perform a switchover operation between computing nodes, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that determining whether to perform a switchover operation between computing nodes may be implemented within the clustered network environment 100 (e.g., nodes within a cloud computing environment and/or nodes outside the cloud computing environment but with communicative access to the cloud computing environment). In an example, the node 116 (e.g., a first computing node) and the node 118 (e.g., a second computing node) may be hosted within a cloud computing environment. In another example, the node 116 may be hosted within the cloud computing environment and the node 118 may be hosted outside the cloud computing environment, where the node 118 has communicative access to the cloud computing environment (e.g., access to cloud persistent storage accessible through a cloud storage service). In another example, the node 116 and the node 118 may be hosted outside the cloud computing environment but may have communicative access to the cloud computing environment (e.g., access to the cloud persistent storage accessible through the cloud storage service). A cloud environment node state provider and/or the cloud persistent storage accessible through the cloud storage service may be used by the node 116 and the node 118 to reliably share operational state information. In this way, a computing node may reliably determine whether a partner computing node has failed, and thus a switchover operation should be performed (e.g., as opposed to erroneously performing a switchover in response to a communication link failure or an infrastructure issue otherwise hindering communication of operational state information). It may be appreciated that determining whether to perform a switchover operation between computing nodes may be implemented for and/or between any type of computing environment, and may be transferrable between physical devices (e.g., node 116, node 118, etc.) and/or the cloud computing environment (e.g., associated with or remote to the clustered network environment 100).

Figure 2:
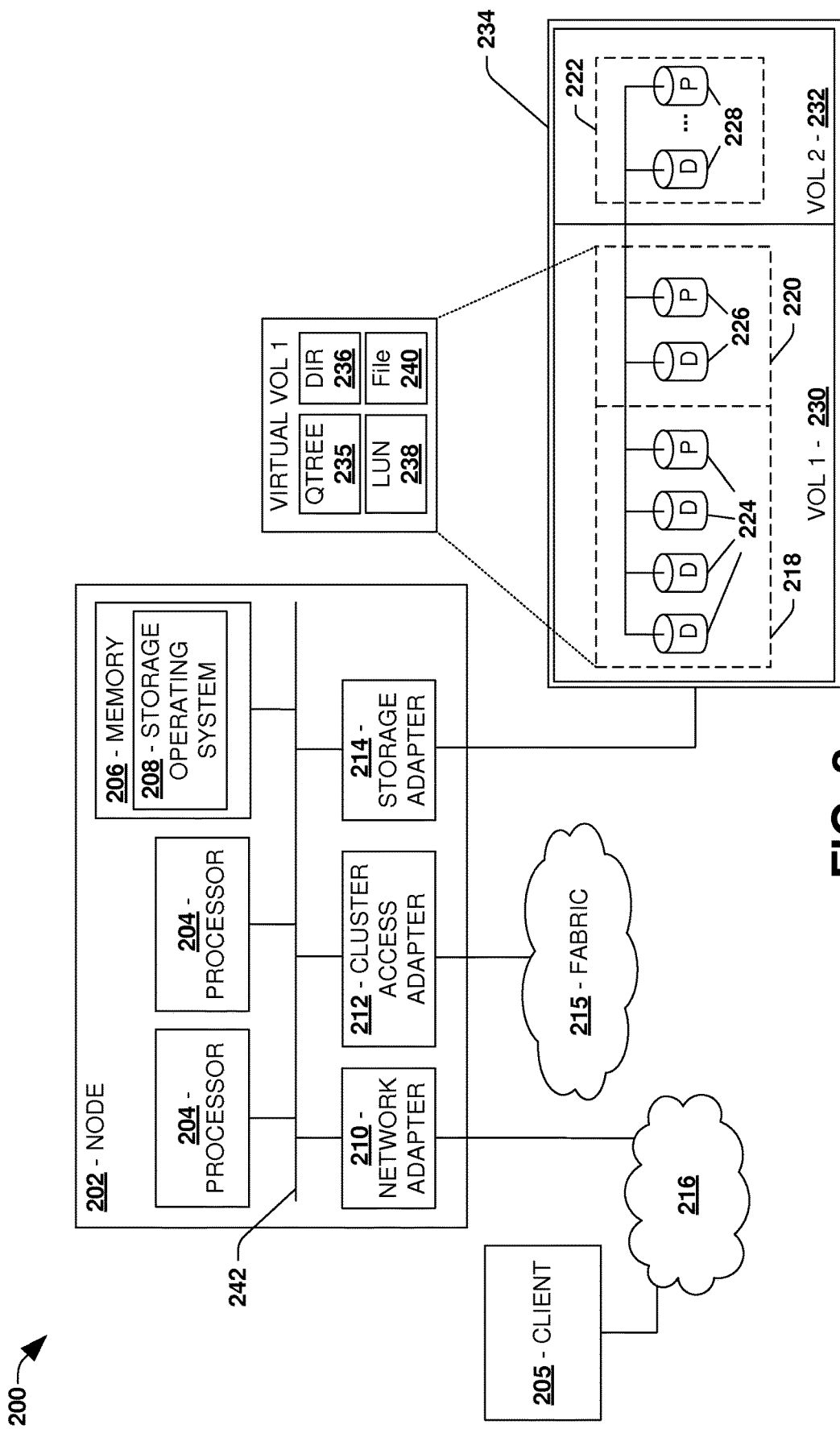
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that determining whether to perform a switchover operation between computing nodes may be implemented for the data storage system 200. In an example, the node 202 (e.g., a first computing nodes) and a second node (e.g., a second computing node) may be hosted within a cloud computing environment associated with the data storage system 200. In another example, the node 202 may be hosted within the cloud computing environment and the second node may be hosted outside the cloud computing environment, where the second node has communicative access to the cloud computing environment (e.g., access to the cloud persistent storage accessible through the cloud storage service). In another example, the node 202 and the second node may be hosted outside the cloud computing environment but may have communicative access to the cloud computing environment (e.g., access to cloud persistent storage accessible through a cloud storage service). A cloud environment node state provider and/or the cloud persistent storage accessible through the cloud storage service may be used by the node 202 and the second node to reliably share operational state information. In this way, a computing node may reliably determine whether a partner computing node has failed, and thus a switchover operation should be performed (e.g., as opposed to erroneously performing a switchover in response to a communication link failure or an infrastructure issue otherwise hindering communication of operational state information). It may be appreciated that determining whether to perform a switchover operation between computing nodes may be implemented for and/or between any type of computing environment, and may be transferrable between physical devices (e.g., node 202, host 205, etc.) and/or the cloud computing environment (e.g., comprising the node 202 and/or the host 205).

Figure 3A:
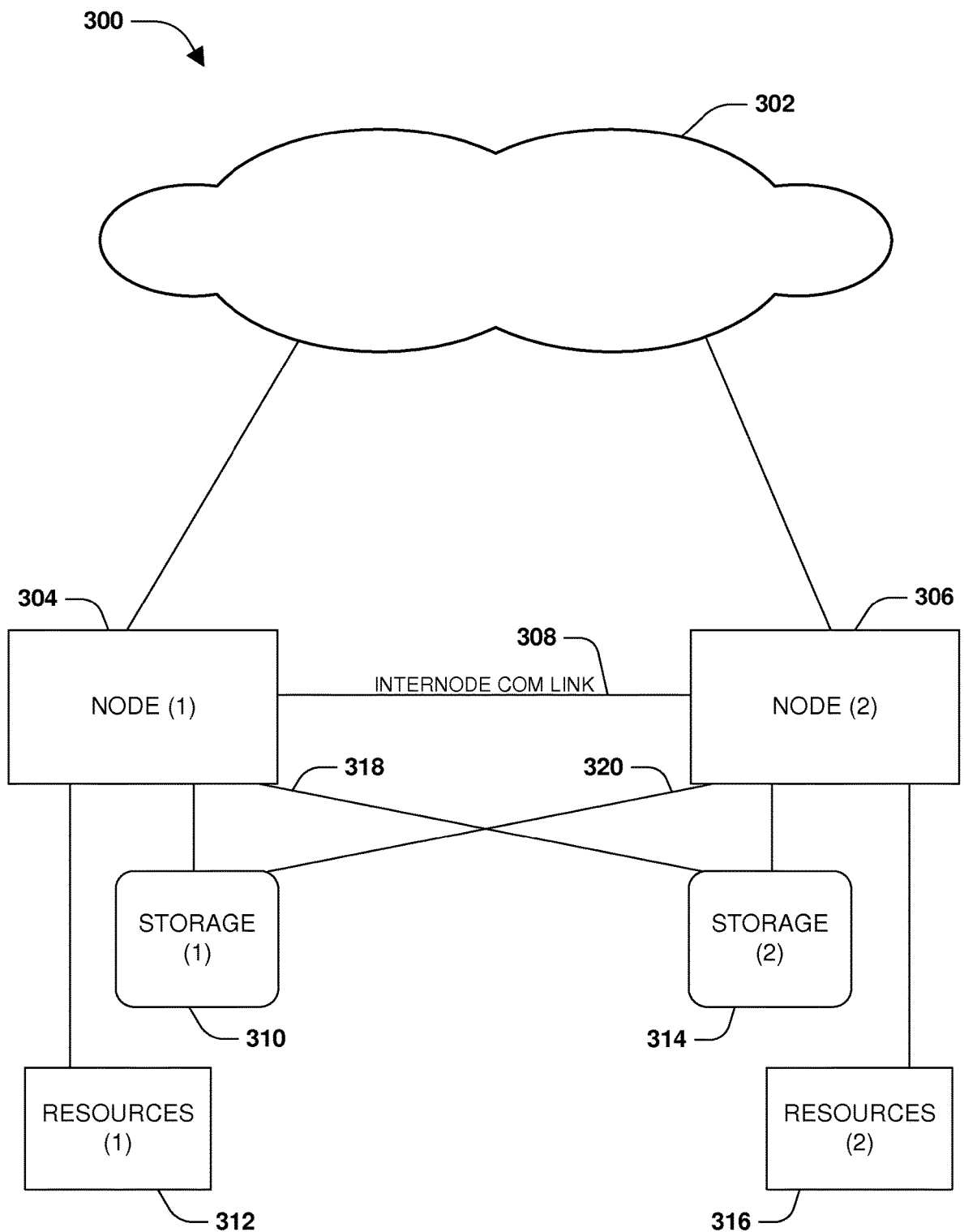
FIG. 3A is a component block diagram illustrating a cloud computing environment.
Figure 3B:
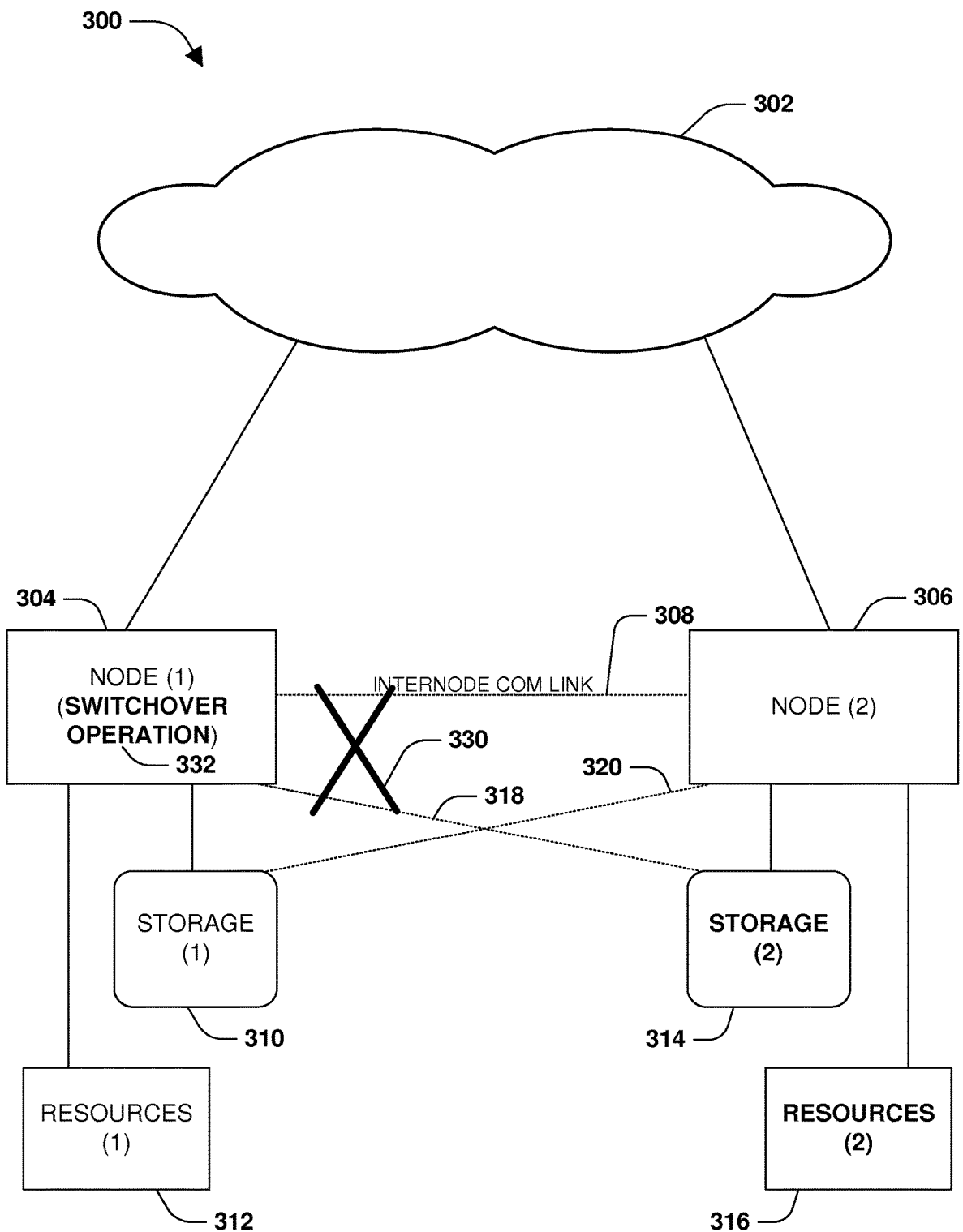
FIG. 3B is a component block diagram illustrating a cloud computing environment, where a first computing node erroneously performs a switchover operation.

FIGS. 3A-3B illustrate a cloud computing environment 300. FIG. 3A illustrates a plurality of computing nodes, such as a first computing node 304 and a second computing node 306, being hosted within the cloud computing environment 300. It may be appreciated that in an example, the first computing node 304 and/or the second computing node 306 may be hosted within a non-cloud computing environment, but may have communicative access to the cloud computing environment 300 (e.g., access to cloud persistent storage accessible through a cloud storage service). The computing nodes may provide resources and/or storage to clients over a network 302. For example, a shopping business provider may deploy computing nodes within the cloud computing environment 300 for hosting a shopping service, a videogame business provider may deploy computing nodes within the cloud computing environment 300 for hosting videogame services, a network storage provider may deploy the first computing node 304 to host storage services for a marketing department of a company client using a first set of resources 312 and a first storage device 310, the network storage provider may deploy the second computing node 306 to host storage services for an engineering department of the company client using a second set of resources 316 and a second storage device 314. In this way, various service providers may utilize the cloud computing environment 300, hosted by a third party cloud provider, to provide services to clients over the network 302.

In an example, the network storage provider may configure the first computing node 304 and the second computing node 306 as disaster recovery partners, such that if a computing node fails, then the surviving computing node will perform a switchover operation to obtain ownership of resources and/or storage devices, previously owned by the failed computing node, in order to provide clients with failover access to services previously provided by the failed computing node using the switched over resources and storage devices. In an example of sharing operational state information used to determine whether to perform a switchover operation, the first computing node 304 and the second computing node 306 may be configured to share operational state information (e.g., a heartbeat and/or an indication as to whether a computing node is operational, failed, rebooting, is in a kernel panic mode, has a relatively high latency and is unable to keep up with client demands, etc.) over an internode communication link 308. For example, the internode communication link 308 may comprise an IP network where the first computing node 304 may send first operational state information to the second computing node 306 using an IP address assigned to the second computing node 306.

In another example of sharing operational state information used to determine whether to perform a switchover operation, the first computing node 304 may be configured to store the first operational state information within the first storage device 310 owned by the first computing node 304. The second computing node 306 may utilize a first cloud infrastructure connection 320 to read the first operational state information from the first storage device 310. Similarly, the second computing node 306 may be configured to store second operational state information within the second storage device 314 owned by the second computing node 306. The first computing node 306 may utilize a second cloud infrastructure connection 318 to read the second operational state information from the second storage device 314. In this way, the first computing node 304 and the second computing node 306 may utilize the internode communication link 308 and/or cloud infrastructure connections for sharing operational state information used to determine whether a switchover operation should be performed.

FIG. 3B illustrates the first computing node 304 detecting a heartbeat loss 330 of operational state information from the second computing node 306. In an example of detecting the heartbeat loss 330, an IP network failure may result in the internode communication link 308 being down, and thus the first computing node 304 may incorrectly determine that the heartbeat loss 330 is a result of the second computing node 306 failing as opposed to the internode communication link 308 being down. In another example of detecting the heartbeat loss 330, a cloud infrastructure failure may result in the second cloud infrastructure connection 318 being down, and thus the first computing node 304 may incorrectly determine that the heartbeat loss 330 is a result of the second computing node 306 failing as opposed to an inability to access operational state information, of the second computing node 306, within the second storage device 314 due to the cloud infrastructure failure. Thus, the first computing node 304 may erroneously implement a switchover operation 332 to take over ownership of the second storage device 314 and/or the second set of resources 316 for providing clients with failover access to storage services previously provided by the second computing node 306 utilizing the second storage device 314 and/or the second set of resources 316. Unfortunately, the first computing node 304 and the second computing node 306 may undesirably contend for ownership of the second storage device 314 and/or the second set of resources 316 because the second computing node 306 is operational and the first computing node 304 is erroneously attempting to perform the switchover operation 332.

Figure 4A:
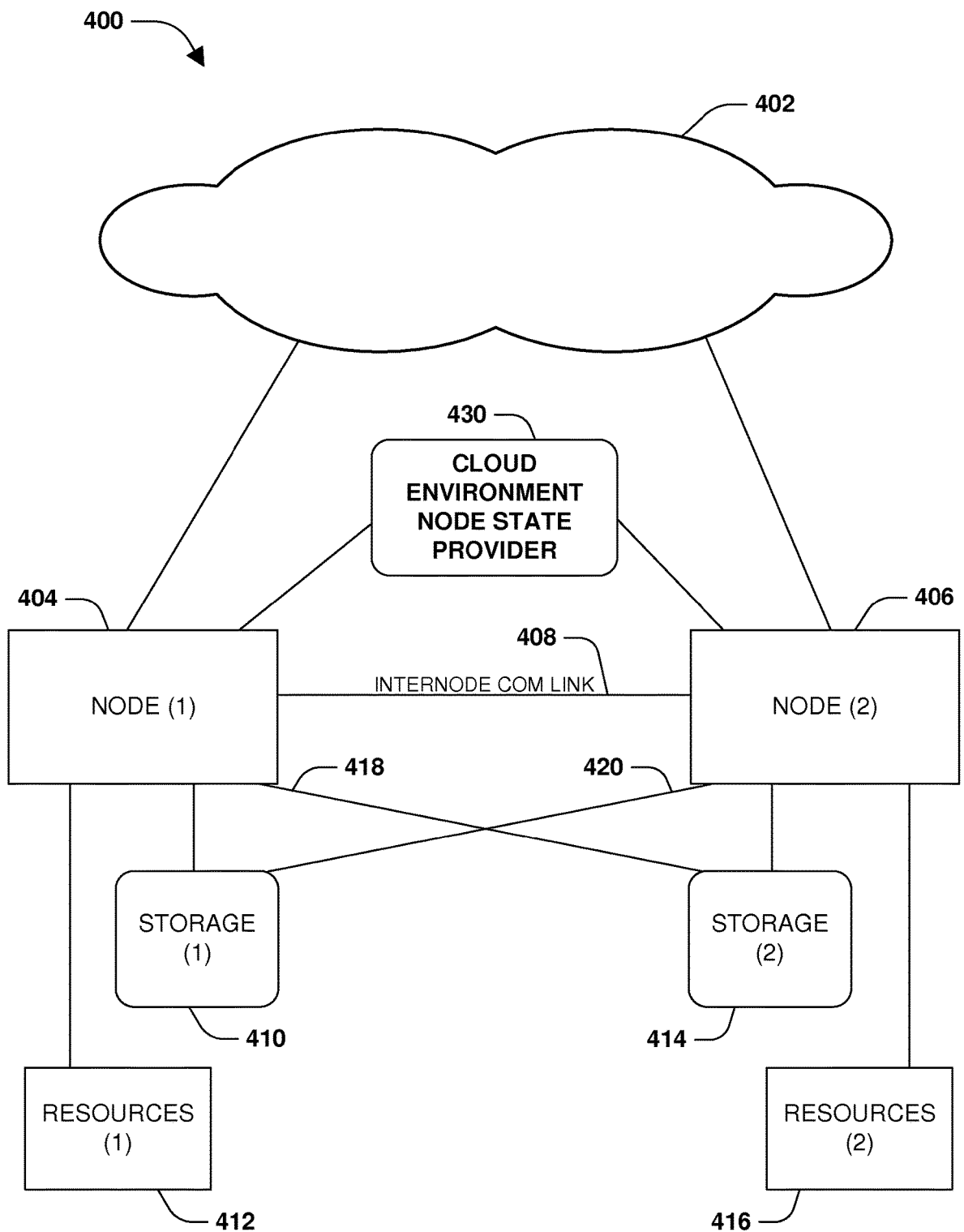
FIG. 4A is a component block diagram illustrating an exemplary computing device for determining whether to perform a switchover operation between computing nodes utilizing a cloud environment node state provider.
Figure 4B:
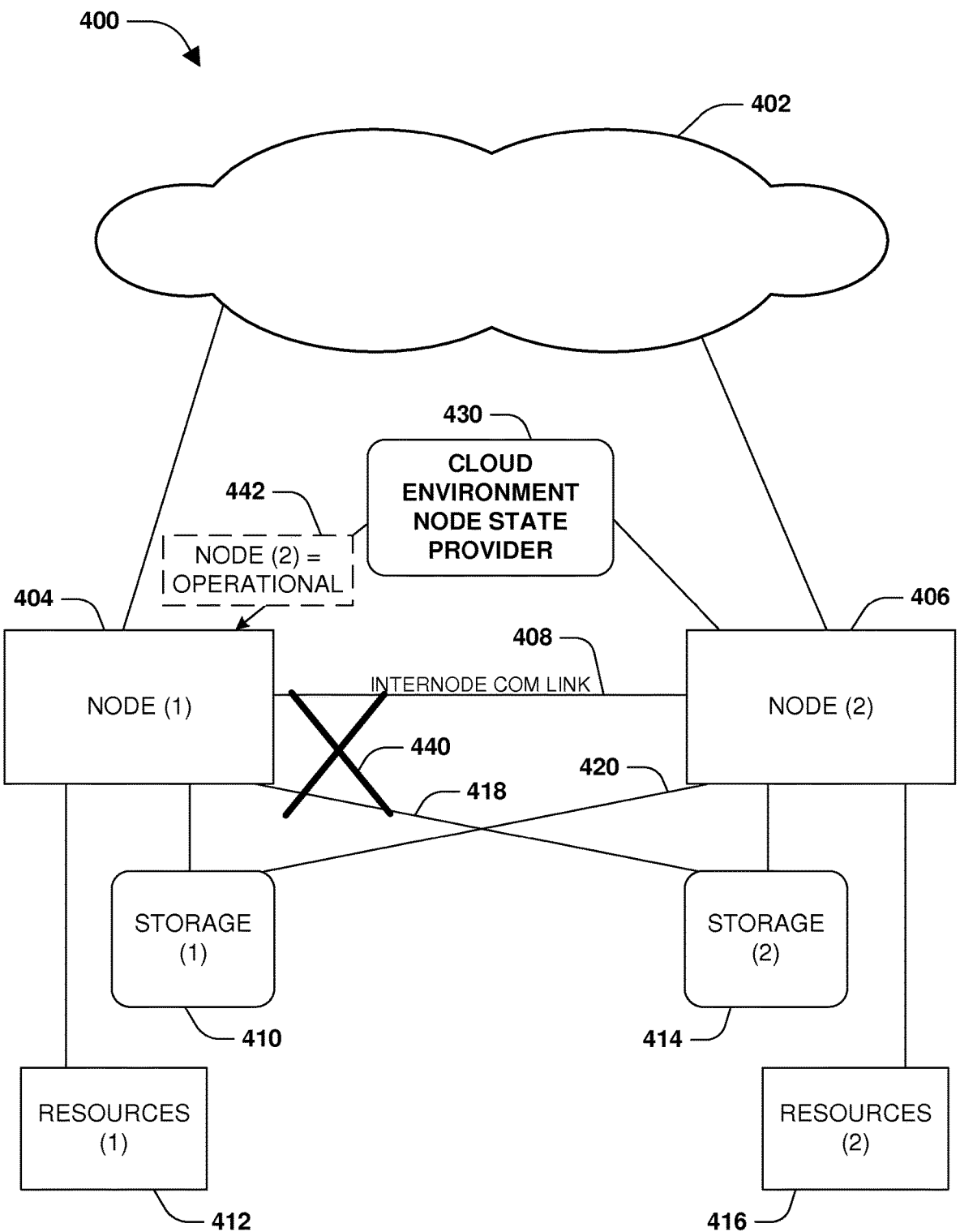
FIG. 4B is a component block diagram illustrating an exemplary computing device for determining whether to perform a switchover operation between computing nodes utilizing a cloud environment node state provider, where a switchover operation is not performed.
Figure 4C:
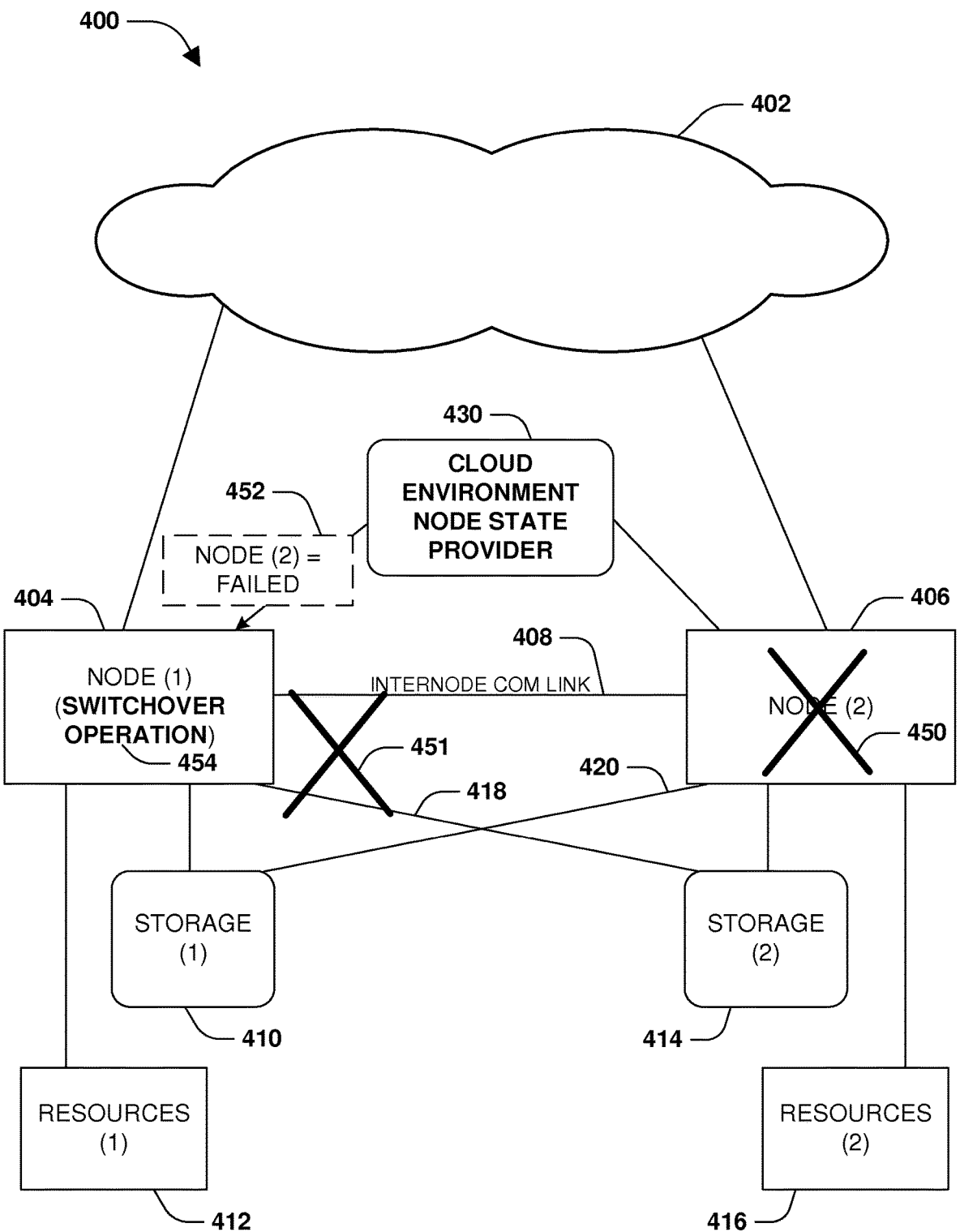
FIG. 4C is a component block diagram illustrating an exemplary computing device for determining whether to perform a switchover operation between computing nodes utilizing a cloud environment node state provider, where a switchover operation is performed.

FIGS. 4A-4C illustrate examples of determining whether to perform a switchover operation between computing nodes. A first computing node 404 and a second computing node 406 may be hosted within a cloud computing environment 400. It may be appreciated that in an example, the first computing node 404 and/or the second computing node 406 may be hosted within a non-cloud computing environment, but may have communicative access to the cloud computing environment 400 (e.g., access to cloud persistent storage accessible through a cloud storage service). In an example, the first computing node 404 may be hosted within a first cloud level zone and the second computing node 406 may be hosted within a second cloud level zone (e.g., hosted within different zones or locations of a data center, within different data centers, etc.). The first computing node 404 may provide clients, over a network 402, with access to a first set of storage resources 412 within the cloud computing environment 400 (e.g., storage resources associated with a first storage device 410 owned by the first computing node 404). The second computing node 406 may provide clients, over the network 402, with access to a second set of storage resources 416 within the cloud computing environment 400 (e.g., storage resources associated with a second storage device 414 owned by the second computing node 406).

An internode communication link 408 may be established between the first computing node 404 and the second computing node 406. For example, the internode communication link 408 may comprise IP based communication, such as an IP network (e.g., as opposed to a direct link, such as a physical link, between the computing nodes, which may be impractical because the computing nodes may be within different cloud level zones, such as within different data centers or locations within a data center). The first computing node 404 and the second computing node 406 may be configured to transmit operational state information (e.g., a heartbeat, an indication of a failure, an indication of normal operation, etc.) over the internode communication link 408.

In an example, the first computing node 404 may be configured to store first operational state information within the first storage device 410 so that the second computing node 406 may read the first operational state information from the first storage device 410 over a first cloud infrastructure connection 420. The second computing node 406 may be configured to store second operational state information within the second storage device 414 so that the first computing node 404 may read the second operational state information from the second storage device 414 over a second cloud infrastructure connection 418.

Because an IP network failure, rendering the internode communication link 408 inoperable, and/or a cloud computing environment infrastructure failure, rendering the first cloud infrastructure connection 420 and the second cloud infrastructure connection 418 inoperable, may provide a false indication that a partner computing node has failed (e.g., a loss of a heartbeat), a cloud environment node state provider 430 may be utilized to verify operational states of computing node. Accordingly, the first computing node 404 and the second computing node 406 may be configured to provide operational state information to the cloud environment node state provider 430 of the cloud computing environment 40. In an example, the cloud environment node state provider 430 may be a service provided by a cloud provider/owner of the cloud computing environment 400, and thus may provide highly available and reliable information regarding whether computing nodes are operational or not.

FIG. 4B illustrates the first computing node 404 detecting a loss 440 of communication over the internode communication link 408 (e.g., a timeout since a last receipt of operation state information from the second computing node 406 over the internode communication link 408) and/or of access to the second storage device 414 (e.g., an inability to access the second storage device 414 over the second cloud infrastructure connection 418) while the second computing node 406 is operational. Responsive to identifying the loss 440, the first computing node 404 may query the cloud environment node state provider 430 for operational state information of the second computing node 406. Because the second computing node 406 is operational, the cloud environment state provider 430 may respond with an operational state message 442 regarding the second computing node 406 being in the operational state. Accordingly, the first computing node 404 may refrain from erroneously performing a switchover operation because the second computing node 406 is operational for providing clients with access to the second set of resources 416. Thus, the first computing node 404 may determine that the loss 440 corresponds to a cloud computing environment infrastructure failure and/or inoperability of the internode communication link 408.

FIG. 4C illustrates the first computing node 404 detecting a loss 451 of communication over the internode communication link 408 (e.g., a timeout since a last receipt of operation state information from the second computing node 406 over the internode communication link 408) and/or of access to the second storage device 414 (e.g., an inability to access the second storage device 414 over the second cloud infrastructure connection 418) while the second computing node 406 is in a failed state 450. Responsive to detecting the loss 451, the first computing node 404 may query the cloud environment node state provider 430 for operational state information of the second computing node 406. Because the second computing node 406 is in the failed state 450 unable to provide clients with access to the second set of resources 416, the cloud environment state provider 430 may respond with a failed state message 452 regarding the second computing node 406. Accordingly, the first computing node 404 may perform a switchover operation 454 to take over ownership of the second storage device 414 and/or the second set of resources 416 for providing clients with failover access to storage services previously provided by the second computing node 406 utilizing the second storage device 414 and/or the second set of resources 416. It may be appreciated that in another example, the first computing node 404 may also query a cloud storage service, hosting cloud persistent storage into which computing nodes may store operational information, to determine the operational state of the second computing node 406 (e.g., FIGS. 5A-5C).

Figure 5A:
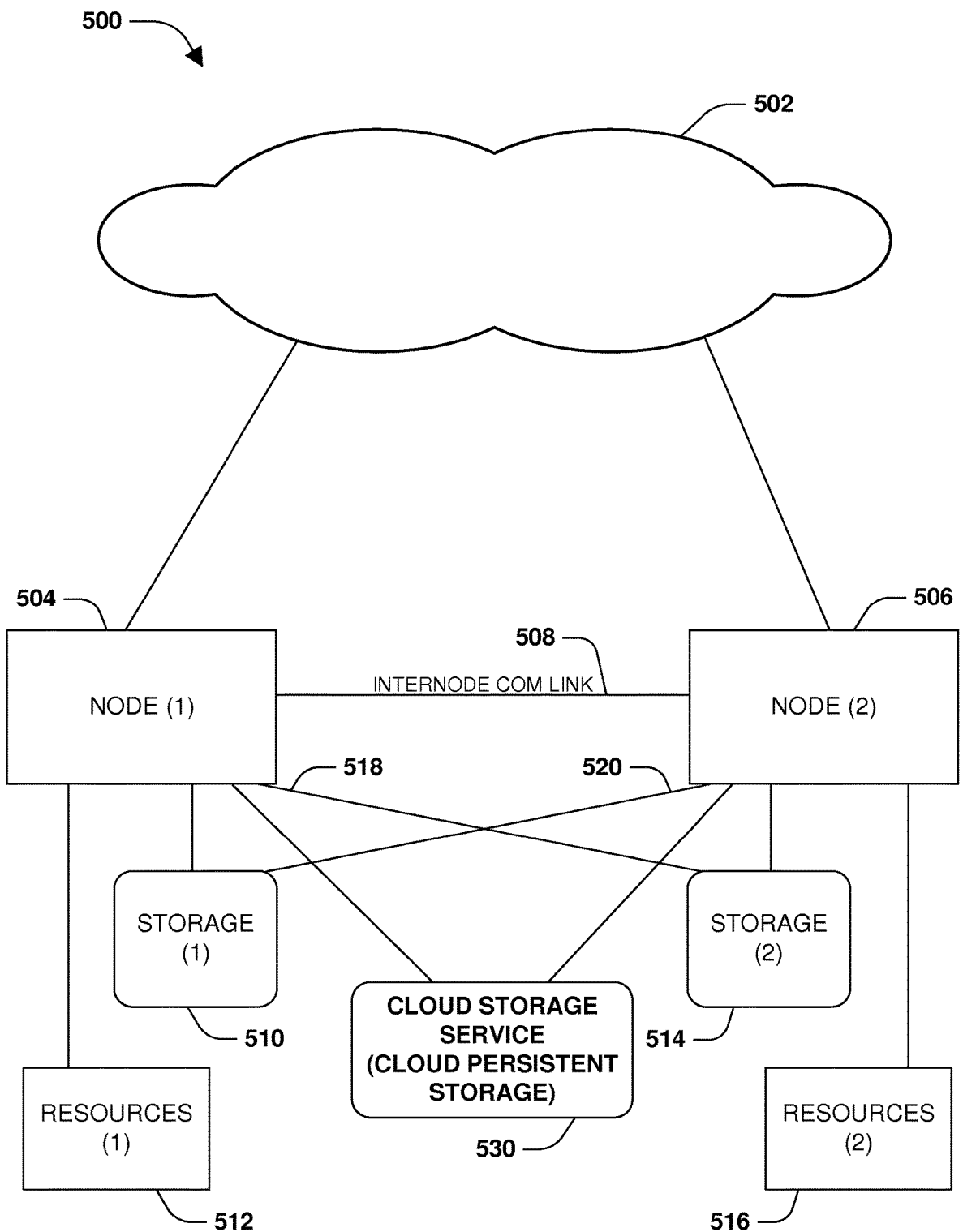
FIG. 5A is a component block diagram illustrating an exemplary computing device for determining whether to perform a switchover operation between computing nodes utilizing a cloud storage service.
Figure 5B:
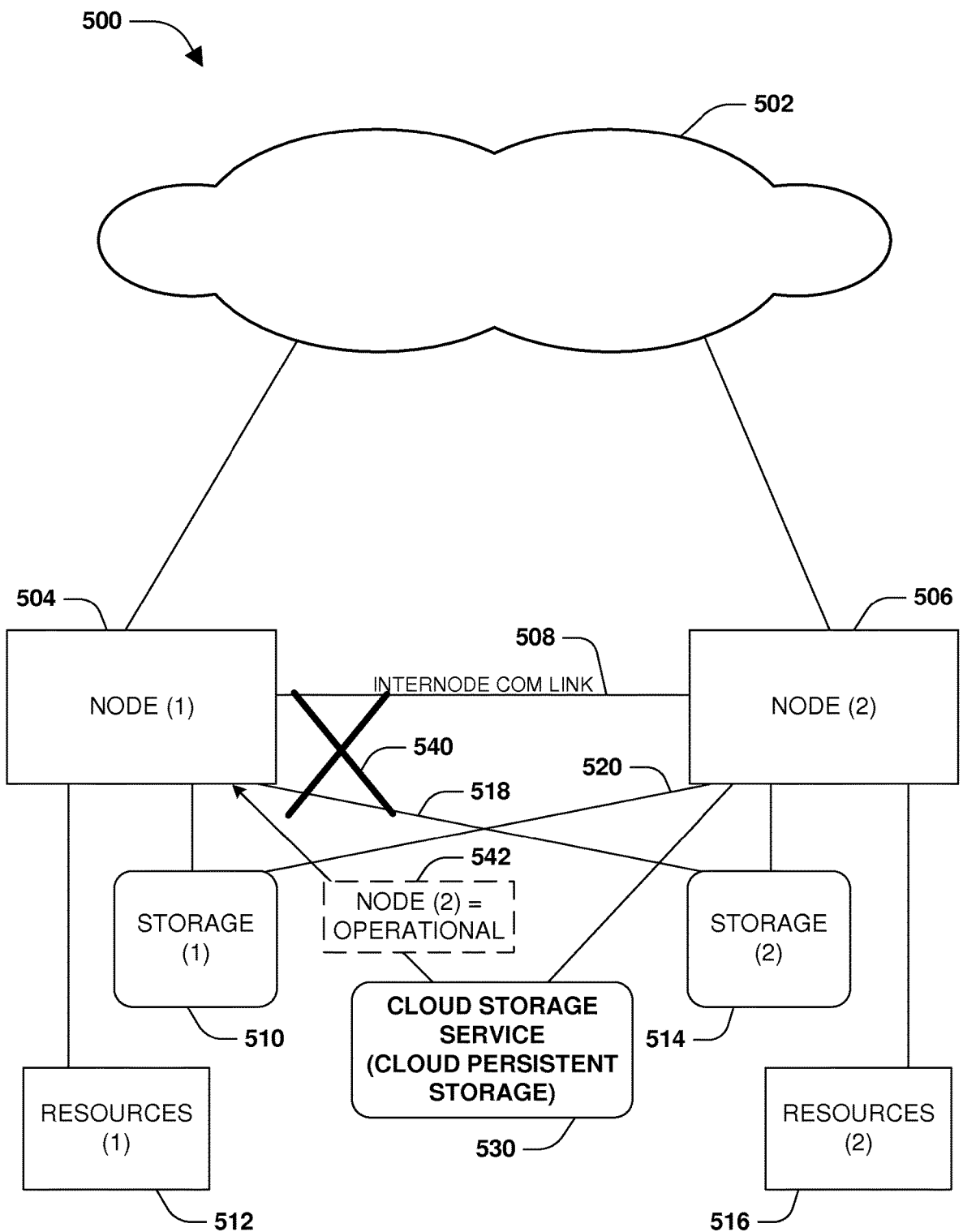
FIG. 5B is a component block diagram illustrating an exemplary computing device for determining whether to perform a switchover operation between computing nodes utilizing a cloud storage service, where a switchover operation is not performed.
Figure 5C:
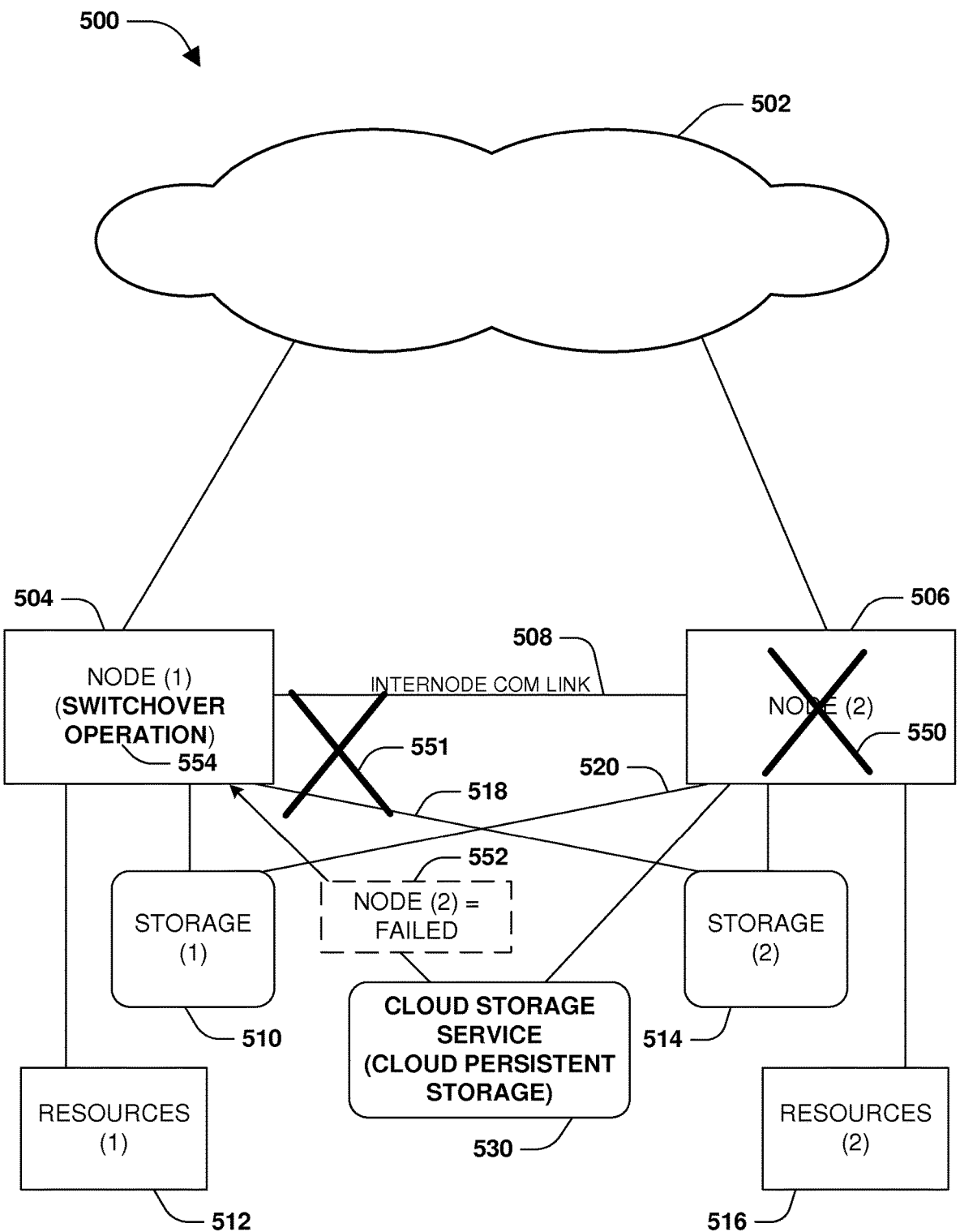
FIG. 5C is a component block diagram illustrating an exemplary computing device for determining whether to perform a switchover operation between computing nodes utilizing a cloud storage service, where a switchover operation is performed.

FIGS. 5A-5C illustrate examples of determining whether to perform a switchover operation between computing nodes. A first computing node 504 and a second computing node 506 may be hosted within a cloud computing environment 500. It may be appreciated that in an example, the first computing node 504 and/or the second computing node 506 may be hosted within a non-cloud computing environment, but may have communicative access to the cloud computing environment 500 (e.g., access to cloud persistent storage accessible through a cloud storage service). In an example, the first computing node 504 may be hosted within a first cloud level zone and the second computing node 506 may be hosted within a second cloud level zone. The first computing node 504 may provide clients, over a network 502, with access to a first set of storage resources 512 within the cloud computing environment 500 (e.g., storage resources associated with a first storage device 510 owned by the first computing node 504). The second computing node 506 may provide clients, over the network 502, with access to a second set of storage resources 516 within the cloud computing environment 500 (e.g., storage resources associated with a second storage device 514 owned by the second computing node 506).

An internode communication link 508 may be established between the first computing node 504 and the second computing node 506. For example, the internode communication link 508 may comprise IP based communication, such as an IP network. The first computing node 504 and the second computing node 506 may be configured to transmit operational state information (e.g., a heartbeat corresponding to a sequence of numbers indicative of progress of a computing node, an indication of a failure, an indication of normal operation, etc.) over the internode communication link 508.

In an example, the first computing node 504 may be configured to store first operational state information within the first storage device 510 so that the second computing node 506 may read the first operational state information from the first storage device 510 over a first cloud infrastructure connection 520. The second computing node 506 may be configured to store second operational state information within the second storage device 514 so that the first computing node 504 may read the second operational state information from the second storage device 514 over a second cloud infrastructure connection 518.

Because an IP network failure, rendering the internode communication link 508 inoperable, and/or a cloud computing environment infrastructure failure, rendering the first cloud infrastructure connection 520 and the second cloud infrastructure connection 518 inoperable, may provide a false indication that a partner computing node has failed (e.g., a loss of a heartbeat), a cloud storage service 530 may be utilized to verify operational states of computing devices. Accordingly, the first computing node 504 and the second computing node 506 may be configured to store operational state information into cloud persistent storage accessible through the cloud storage service 530 of the cloud computing environment 500. In an example, the cloud storage service 530 and the cloud persistent storage are provided by a cloud provider/owner of the cloud computing environment 500, and thus may provide highly available and reliable information regarding whether computing nodes are operational or not.

FIG. 5B illustrates the first computing node 504 detecting a loss 540 of communication over the internode communication link 508 (e.g., a timeout since a last receipt of operation state information from the second computing node 506 over the internode communication link 508) and/or of access to the second storage device 514 (e.g., an inability to access the second storage device 514 over the second cloud infrastructure connection 518) while the second computing node 506 is operational. Responsive to detecting the loss 540, the first computing node 504 may query the cloud storage service 530 for operational state information 542 stored by the second computing node 506 within the cloud persistent storage (e.g., a heartbeat comprising sequences numbers indicating progress of the second computing node 506; an indication of a failure, kernel panic, or normal operating state; etc.). Because the operational state information 542 may indicate that the second computing node 506 is operational, the first computing node 504 may refrain from erroneously performing a switchover operation because the second computing node 506 is operational for providing clients with access to the second set of resources 516. Thus, the first computing node 504 may determine that the loss 540 corresponds to a cloud computing environment infrastructure failure and/or inoperability of the internode communication link 508.

FIG. 5C illustrates the first computing node 504 detecting a loss 551 of communication over the internode communication link 508 (e.g., a timeout since a last receipt of operation state information from the second computing node 506 over the internode communication link 508) and/or of access to the second storage device 514 (e.g., an inability to access the second storage device 514 over the second cloud infrastructure connection 518) while the second computing node 506 is in a failed state 550. Responsive to detecting the loss 551, the first computing node 504 may query the cloud storage service 530 for operational state information 552 stored by the second computing node 506 within the cloud persistent storage (e.g., a heartbeat comprising sequences numbers indicating progress of the second computing node 506; an indication of a failure, kernel panic, or normal operating state; etc.). Because the operational state information 552 may indicate that the second computing node 506 is in the failed state 550 unable to provide clients with access to the second set of resources 516, the first computing node 504 may perform a switchover operation 554 to take over ownership of the second storage device 514 and/or the second set of resources 516 for providing clients with failover access to storage services previously provided by the second computing node 506 utilizing the second storage device 514 and/or the second set of resources 516. It may be appreciated that in another example, the first computing node 504 may also query a cloud environment node state provider to determine the operational state of the second computing node 506 (e.g., FIGS. 4A-4C).

Figure 6:
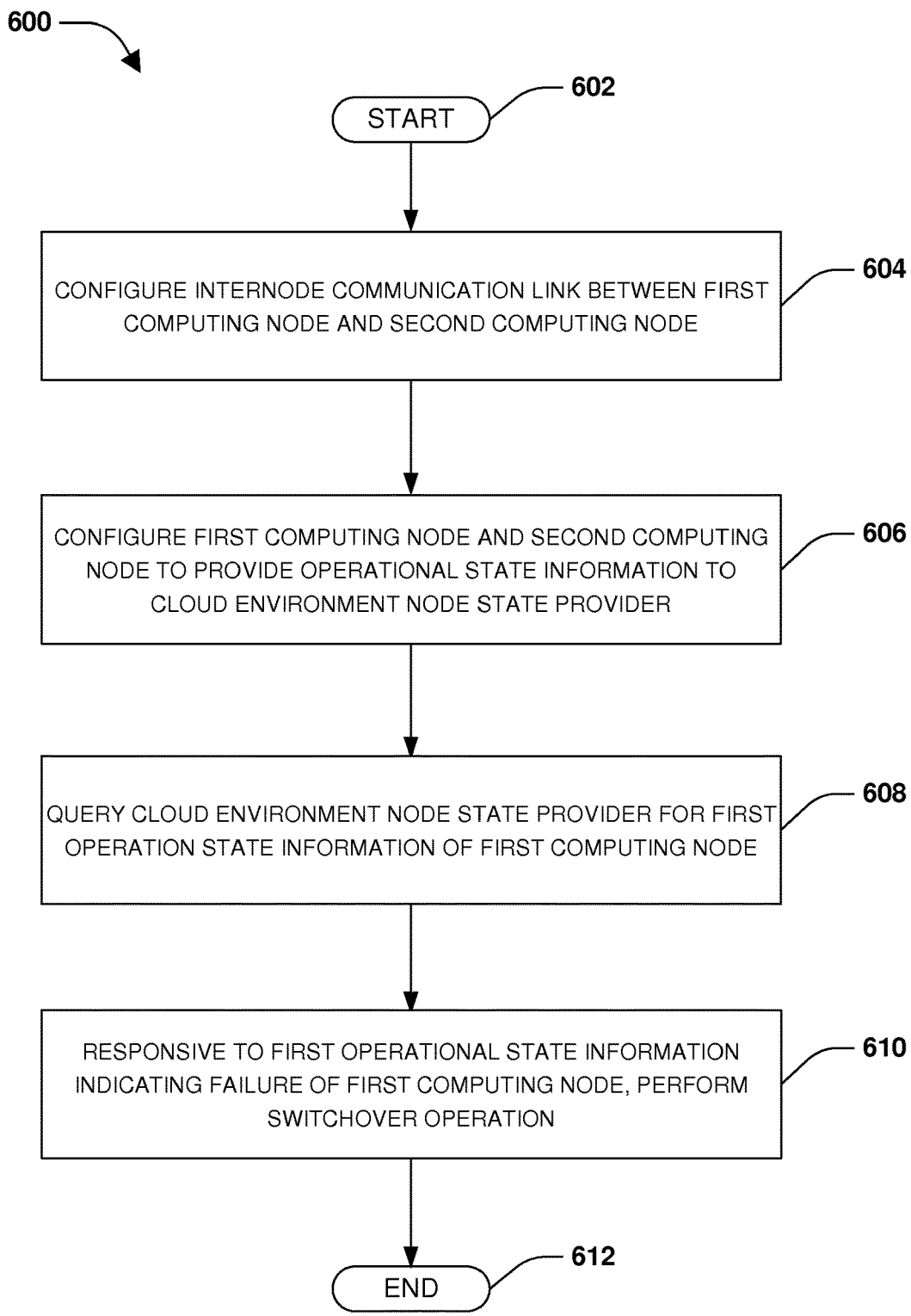
FIG. 6 is a flow chart illustrating an exemplary method of determining whether to perform a switchover operation between computing nodes utilizing a cloud environment node state provider.

One embodiment of determining whether to perform a switchover operation between computing nodes is illustrated by an exemplary method 600 of FIG. 6. At 602, the method 600 starts. At 604, an internode communication link is established between a first computing node and a second computing node hosted within a cloud computing environment. The first computing node is configured to provide clients with access to a first set of resources within the cloud computing environment. The second computing node is configured to provide clients with access to a second set of resources within the cloud computing environment. At 606, the first computing node and the second computing node are configured to provide operational state information to a cloud environment node state provider of the cloud computing environment.

Responsive to identifying a loss of communication over the internode communication link, the cloud environment node state provider may be queried for first operational state information of the first computing node, at 608. At 610, responsive to the first operational state information indicating a failure of the first computing node, a switchover operation may be performed from the first computing node to the second computing node for providing clients with failover access to the first set of resources, previously accessible to clients through the first computing node, based upon the second computing node being a failure recovery partner for the first computing node. At 612, the method 600 ends.

Figure 7:
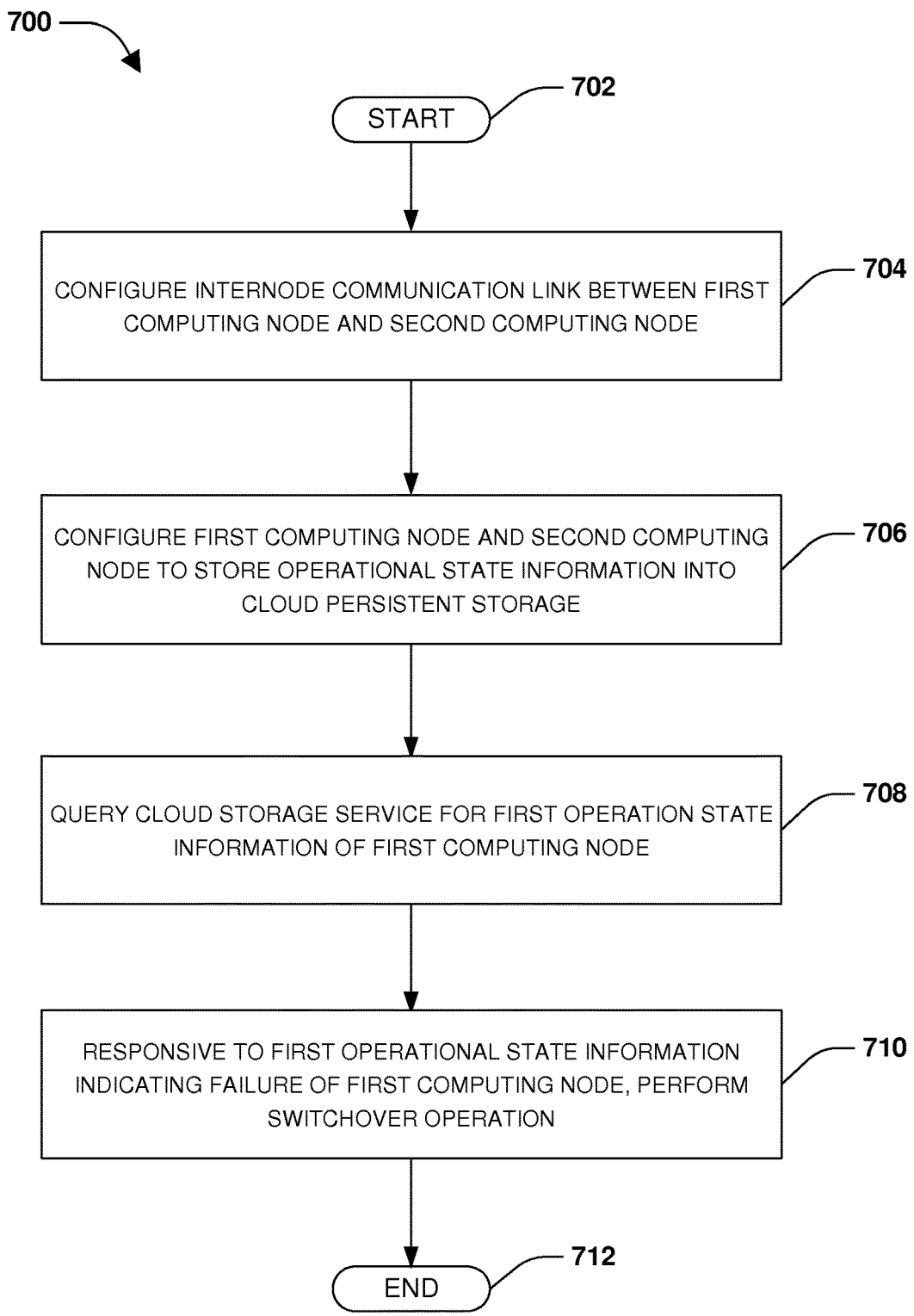
FIG. 7 is a flow chart illustrating an exemplary method of determining whether to perform a switchover operation between computing nodes utilizing a cloud storage service.

One embodiment of determining whether to perform a switchover operation between computing nodes is illustrated by an exemplary method 700 of FIG. 7. At 702, the method 700 starts. At 704, an internode communication link is established between a first computing node and a second computing node. In an example, the first computing node and the second computing node may be hosted within a cloud computing environment. In another example, the first computing node and the second computing node may be hosted within a non-cloud computing environment (e.g., a cluster network storage environment), but may have communicative access to the cloud computing environment. In another example, the first computing node may be hosted within the cloud computing environment and the second computing node may be hosted within the non-cloud computing environment, where the second computing node has communicative access to the cloud computing environment. The first computing node is configured to provide clients with access to a first set of resources. The second computing node is configured to provide clients with access to a second set of resources. At 706, the first computing node and the second computing node are configured to store operational state information into cloud persistent storage accessible through a cloud storage service of the cloud computing environment.

Responsive to identifying a loss of communication over the internode communication link, the cloud storage service may be queried for first operational state information of the first computing node, at 708. At 710, responsive to the first operational state information indicating a failure of the first computing node, a switchover operation may be performed from the first computing node to the second computing node for providing clients with failover access to the first set of resources, previously accessible to clients through the first computing node, based upon the second computing node being a failure recovery partner for the first computing node. At 712, the method 700 ends.

Figure 8:
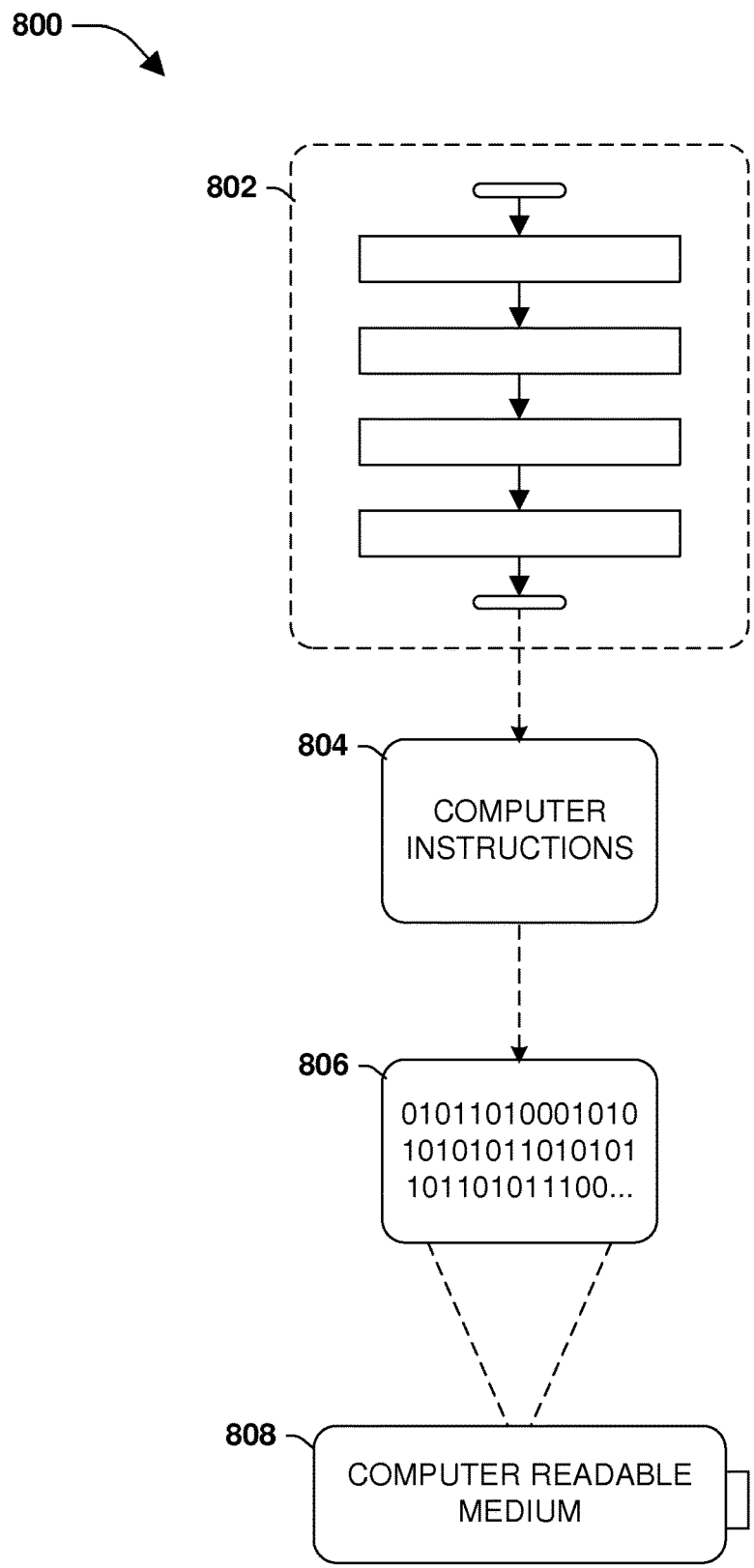
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-ft DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 600 of FIG. 6 and/or at least some of the exemplary method 700 of FIG. 7, for example. In some embodiments, the processor-executable instructions 804 are configured to implement a system, such as at least some of the exemplary system 400 of FIGS. 4A-4C and/or at least some of the exemplary system 500 of FIGS. 5A-5C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   in response to detecting a loss of a communication link between a first node and a second node that are hosted within a cloud environment, wherein operational state information is shared between the first node and the second node over the communication link:
      retrieving, from a cloud environment state provider by the first node, monitored state information specifying an operational state of the second node, the operational state comprising a failed state message if the second node has failed and is unable to provide clients with access to a set of resources;
      reading, by the first node over an active communication link different than the lost communication link, operational state information stored by the second node within a storage device owned by the second node;
      in response to a combination of both the operational state from the cloud environment state provider comprising the failed state message and the operational state information from the storage device indicating that the second node has failed, selectively performing, by the first node, a switchover operation to take over for the second node and provide clients with access to the set of resources based upon the second node failing; and
      in response to either the operational state from the cloud environment state provider not comprising the failed state message or the operational state information from the storage device indicating that the second node is operational, selectively refraining, by the first node, from erroneously performing the switchover operation.

2. The method of claim 1, wherein the first node comprises a first storage controller in the cloud environment and the second node comprises a second storage controller in the cloud environment, wherein the first storage controller and the second storage controller provide external devices, remote to the cloud environment, with storage functionality using storage devices in the cloud environment.

3. The method of claim 1, wherein the cloud environment state provider comprises a service provided by a third party cloud provider hosting the cloud environment.

4. The method of claim 1, comprising:
   determining, by the first node, whether to perform the switchover operation based upon the combination of the monitored state information retrieved by the first node from the cloud environment state provider and the operational information retrieved by the first node from the storage device.

5. The method of claim 1, comprising:
   querying a cloud service for the operational state information based upon a loss of access by the first node to the storage device.

6. The method of claim 1, comprising:
   determining that the communication link is inoperable based upon the operational state indicating that the second node is operational.

7. The method of claim 1, comprising:
identifying the loss of the communication link based upon a timeout from a last receipt of the operational state information over the communication link by the first node.

8. The method of claim 1, comprising:
determining that a cloud computing environment infrastructure failure has occurred, resulting in the loss of the communication link, based upon the operational state indicating that the second node is operational.

9. The method of claim 1, comprising:
establishing the communication link as an internet protocol IP based communication link.

10. The method of claim 9, comprising:
configuring the first node to transmit the operational state information over the communication link using an IP address of the second node.

11. The method of claim 9, comprising:
configuring the second node to transmit the operational state information over the communication link using an IP address of the first node.

12. The method of claim 1, wherein the first node is hosted within a first cloud level zone and the second node is hosted within a second cloud level zone separate from the first cloud level zone.

13. A non-transitory machine readable medium comprising instructions for performing a method, which when executed by a machine, causes the machine to:
in response to detecting a loss of a communication link between a first node and a second node that are hosted within a cloud environment, wherein operational state information is shared between the first node and the second node over the communication link:
retrieve, from a cloud environment state provider by the first node, monitored state information specifying an operational state of the second node, the operational state comprising a failed state message if the second node has failed and is unable to provide clients with access to a set of resources;
read, by the first node over an active communication link different than the lost communication link, operational state information stored by the second node within a storage device owned by the second node;
in response to a combination of both the operational state from the cloud environment state provider comprising the failed state message and the operational state information from the storage device indicating that the second node has failed, selectively perform, by the first node, a switchover operation to take over for the second node and provide clients with access to the set of resources based upon the second node failing; and
in response to either the operational state from the cloud environment state provider not comprising the failed state message or the operational state information from the storage device indicating that the second node is operational, selectively refrain, by the first node, from erroneously performing the switchover operation.

14. The non-transitory machine readable medium of claim 13, wherein the first node triggers a determination as whether to perform the switchover operation based upon the loss of the communication link.

15. The non-transitory machine readable medium of claim 13, wherein the instructions cause the machine to:
configure the second node to store the operational state information into the storage device owned by the second node and accessible to the first node.

16. The non-transitory machine readable medium of claim 15, wherein the instructions cause the machine to:
retrieve, by the first node, the operational state information from the storage device to use in determining whether to perform the switchover operation.

17. The non-transitory machine readable medium of claim 15, wherein the instructions cause the machine to:
query a cloud storage service for the operational state information based upon a loss of access by the first node to the storage device.

18. A computing device comprising:
a memory comprising machine executable code; and
a processor coupled to the memory, the processor configured to execute the machine executable code to cause the processor to:
in response to detecting a loss of a communication link between a first node and a second node that are hosted within a cloud environment, wherein operational state information is shared between the first node and the second node over the communication link:
retrieve, from a cloud environment state provider by the first node, monitored state information specifying an operational state of the second node, the operational state comprising a failed state message if the second node has failed and is unable to provide clients with access to a set of resources;
read, by the first node over an active communication link different than the lost communication link, operational state information stored by the second node within a storage device owned by the second node;
in response to a combination of both the operational state from the cloud environment state provider comprising the failed state message and the operational state information from the storage device indicating that the second node has failed, selectively perform, by the first node, a switchover operation to take over for the second node and provide clients with access to the set of resources based upon the second node failing; and
in response to either the operational state from the cloud environment state provider not comprising the failed state message or the operational state information from the storage device indicating that the second node is operational, selectively refrain, by the first node, from erroneously performing the switchover operation.

19. The computing device of claim 18, wherein the machine executable code causes the processor to:
determine that the communication link is inoperable based upon the operational state indicating that the second node is operational.

20. The computing device of claim 18, wherein the machine executable code causes the processor to:
identify the loss of the communication link based upon a timeout from a last receipt of operational state information over the communication link.

* * * * *